United States Patent [19]

Brown et al.

[11] 4,377,109
[45] Mar. 22, 1983

[54] APPARATUS FOR BAKING FOOD PRODUCTS SUCH AS PIZZAS AND THE LIKE

[75] Inventors: Ernest C. Brown, Danvers; Walter E. Buske, Amesbury, both of Mass.

[73] Assignee: Wolverine Corporation, Methuen, Mass.

[21] Appl. No.: 266,199

[22] Filed: May 22, 1981

[51] Int. Cl.³ .............................................. A47J 37/00
[52] U.S. Cl. ........................................ 99/401; 99/386; 99/443 C; 99/447; 126/21 A; 126/41 C
[58] Field of Search ............ 99/401, 447, 386, 443 C; 126/41 C, 21 A; 426/523; 419/388, 400

[56] References Cited

U.S. PATENT DOCUMENTS

| | | | |
|---|---|---|---|
| 1,647,872 | 11/1927 | Leavitt | 99/386 X |
| 1,656,709 | 1/1928 | Kelly | 99/386 |
| 2,076,479 | 4/1937 | O'Connell | 126/41 C |
| 2,112,309 | 3/1938 | Santillan | 99/386 X |
| 2,244,670 | 6/1941 | Benedict | 99/386 X |
| 3,340,794 | 9/1967 | Giuliano | 99/443 |
| 3,379,141 | 4/1968 | Groth | 99/386 X |
| 3,646,880 | 3/1972 | Norris | 99/349 |
| 3,732,803 | 5/1973 | Buxmann | 99/357 |
| 3,757,671 | 9/1973 | Warshauer | 99/400 |
| 3,873,755 | 3/1975 | McKay | 99/386 |
| 3,908,533 | 9/1975 | Fagerstrom | 99/386 |
| 4,112,912 | 9/1978 | Ballentine | 126/41 R |
| 4,121,509 | 10/1978 | Baker | 99/386 |
| 4,154,861 | 5/1979 | Smith | 426/466 |
| 4,176,589 | 12/1979 | Stuck | 99/386 |
| 4,188,868 | 2/1980 | Baker | 99/386 |
| 4,244,285 | 1/1981 | Baker | 99/339 |
| 4,252,055 | 2/1981 | Johansson | 99/386 |

FOREIGN PATENT DOCUMENTS 579895 8/1946 United Kingdom .................. 99/386

Primary Examiner—Billy J. Wilhite

[57] ABSTRACT

A product conveyor that has a predominately open area transports food substances such as pizzas and the like to be cooked through a thermally insulated treatment zone. An array of nozzles disposed below the conveyor across the width and along the length of the treatment zone discharges streams of heated air upwardly through the conveyor against the bottom surfaces of the food products on the conveyor for primary heat exchange treatment. A reflection surface forms an upper boundary of the treatment zone, and the portion of the upwardly flowing air streams that is not deflected by the food products on the conveyor impinges against the deflection surface and is transformed into downward flowing relatively low velocity air for flow against and across the top surfaces of the food products. After those heat exchange interactions the air is drawn downwardly between the nozzles for exhaust at a point located below the conveyor.

8 Claims, 8 Drawing Figures

APPARATUS FOR BAKING FOOD PRODUCTS SUCH AS PIZZAS AND THE LIKE

This invention relates to material treatment, and more particularly to systems of the type particularly useful in the food industry for baking food substances such as pizzas and the like.

Cooking of foods induces complex chemical and physical changes, and food properties such as texture, flavor, odor, and appearance frequently change relatively rapidly during the cooking process, conditions desirable for enjoyable consumption often being quite transient. Particular problems have been encountered in the cooking of food products such as pizzas, particularly in fast service restaurants where quality cooking should be efficiently accomplished in both large volume and small volume amounts. The cooking apparatus should be easy to operate and high standards of sanitation should be maintained with minimum down time and minimum operator effort and skill.

The present invention is particularly useful in the cooking (baking) of pizzas and pizza related products. Pizzas include a pastry shell with topping ingredients such as tomato paste, cheese, seasonings, and optional other vegetable, meat, or similar ingredients. The shell of the pizza must be baked relatively slowly and the shell dough should be cooked through with a flaky tender crust that is browned but not burned, and the topping ingredients not burned. Pizza products have various styles including relatively thick pizza pies (1½ inches or more in thickness), and thin pizzas (less than ½ inch thick) and a range of shapes and diameters within each style.

In accordance with the invention there is provided apparatus for cooking food substances such as pizzas and the like. In apparatus in accordance with the invention, a thermally insulated chamber defines a treatment zone and a product conveyor is provided for transporting food substances to be cooked through the treatment zone. The conveyor has a predominately open area permitting flow of air therethrough and an array of nozzles is disposed below the conveyor across the width and along the length of the treatment zone. The nozzle array discharges streams of heated air upwardly through the conveyor against the bottom surfaces of the food products on the conveyor for primary heat exchange treatment. Disposed above the conveyor is a reflection surface which forms an upper boundary of the treatment zone, and the portion of the upwardly flowing air streams that is not deflected by the food products on the conveyor impinges against the deflection surface and is transformed into downward flowing relatively low velocity air for flow against and across the top surfaces of the food products. After those heat exchange interactions the air is drawn downwardly between the nozzles for exhaust at a point located below the conveyor.

In a particular embodiment the nozzle area is less than five percent of the total treatment zone area and the velocity of the downwardly flowing air is less than ten percent of the velocity of the upwardly flowing air. This differential velocity interaction on the food products provides efficient and uniform cooking of pizzas (not over or under cooked), does not require skilled cooking techniques, and is tolerant of a wide range of conveyor loadings. Both thick and thin type pizzas may be cooked concurrently and substantially independently of the conveyor loading with a fixed conveyor speed and a fixed cooking interval. In a particular embodiment a pizza product is cooked in about five minutes with air circulation of about 2000 cubic feet per minute in a substantially closed, energy efficient system.

In preferred embodiments, the nozzle array includes a series of nozzle units, each of which has a discharge orifice in the form of an elongated slot that extends transversely of the direction of motion of the conveyor; and in a particular embodiment each nozzle unit has a body portion of triangular configuration with the discharge slot orifice at the apex of the triangle, the discharge slot orifice extending between spaced end walls with a supply port in one end wall and distribution baffle structure within the nozzle chamber in the flow path between the supply port and the discharge slot orifice. In that embodiment, the nozzle units are readily accessible and easily removable as required to facilitate maintenance of the oven system in a clean, sanitary condition. Treatment chamber surfaces are of stainless steel and the deflection surface is a smooth planar surface that extends parallel to and is spaced above the conveyor a distance greater than the distance that the orifices of the nozzle array are spaced below the conveyor. The air flow system includes a conditioning plenum, heating means coupled to the conditioning plenum for heating air, a distribution chamber coupled between the conditioning plenum and the nozzle array, a return passage coupled between the bottom of the treatment zone and the conditioning plenum, and circulation means is coupled to the conditioning plenum for flowing heated air from the conditioning plenum through the distribution chamber to the nozzle array.

In a particular embodiment that provides efficient, uniform, and rapid cooking of a wide range of pizzas, the treatment zone is about five feet in length with discharge nozzle slot orifices that extend across the width of the treatment zone spaced at about half foot intervals along the length of the treatment zone; the conveyor is operated at a speed of about one foot per minute; air is circulated through the oven system at a rate of about 2000 cubic feet per minute in a controlled manner that minimizes escape of heat to the atmosphere, with air being discharged from the nozzles at a velocity in the order of 4000 feet per minute.

Other features and advantages will be seen as the following description of a particular embodiment progresses, in conjunction with the drawings, in which.

Figure 1:
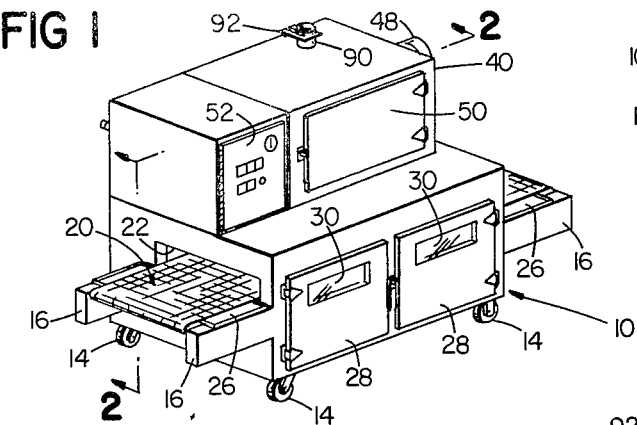
FIG. 1 is a perspective view of an oven system in accordance with the invention.
Figure 5:
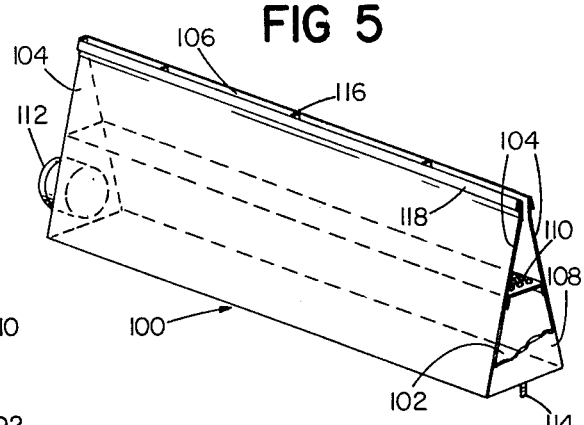
Figure 2:
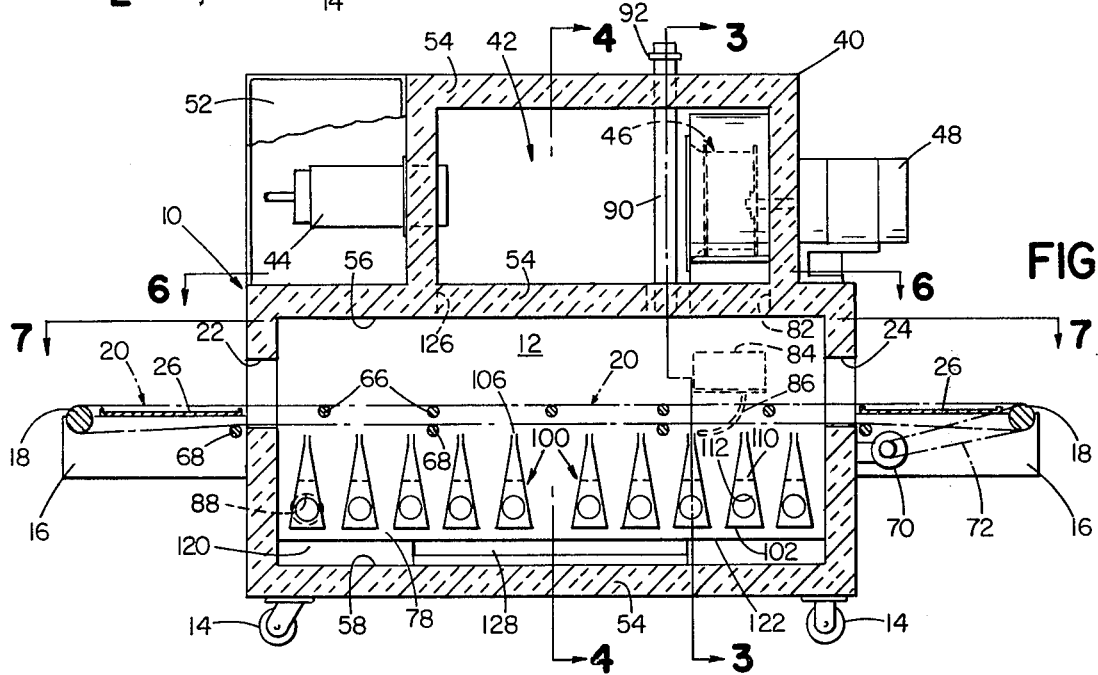
FIG. 2 is a sectional view taken along the line 2—2 of FIG. 1.
Figures 3, 4:
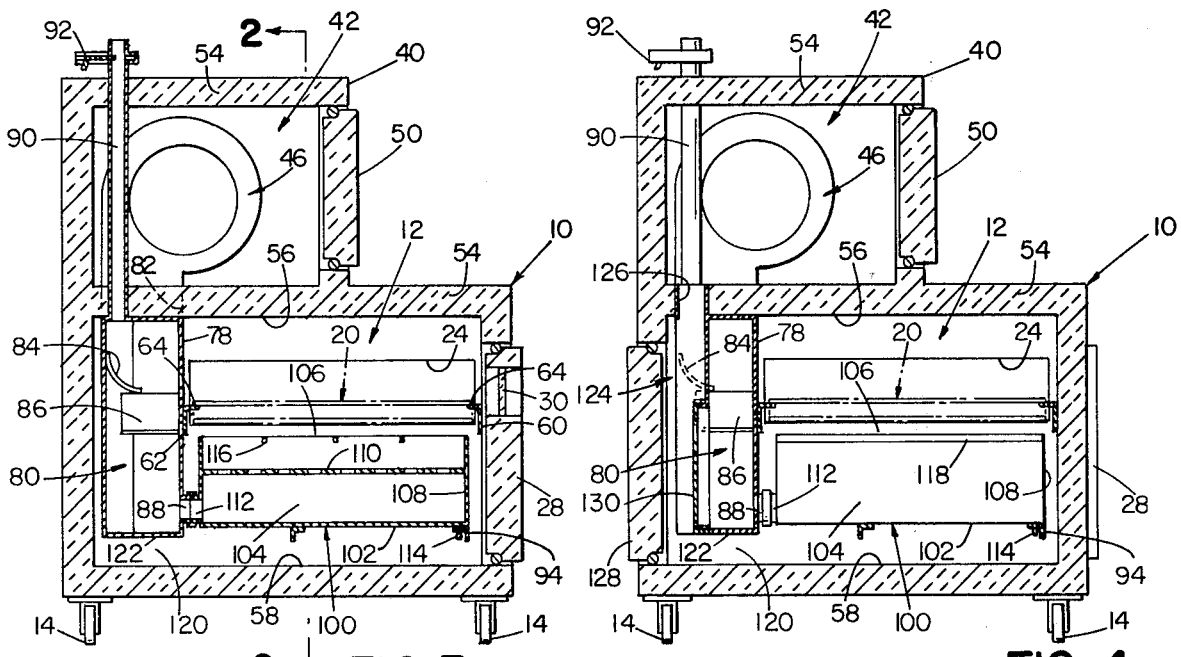
Figure 6:
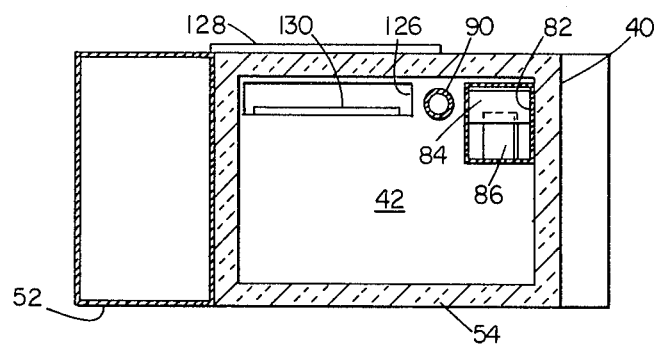
Figure 7:
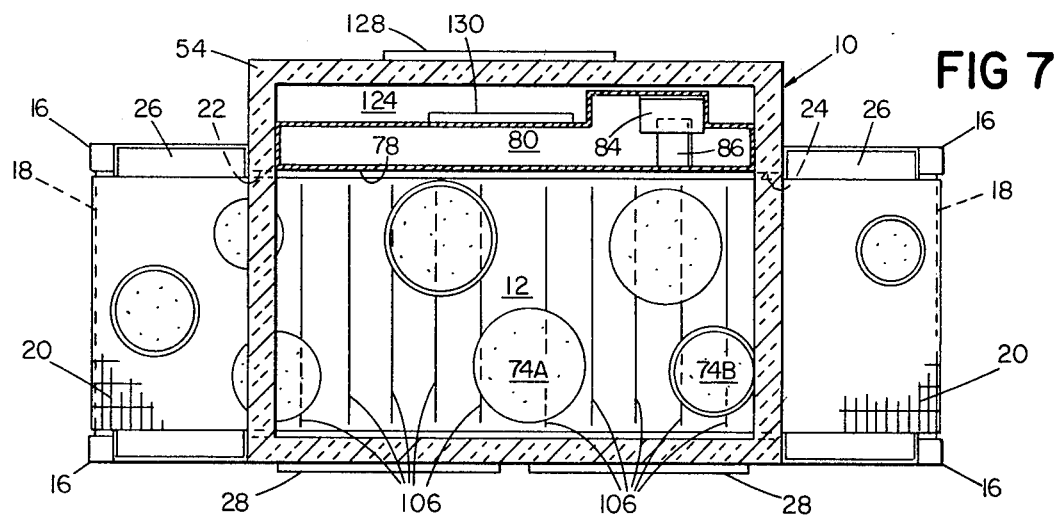
Figure 8:
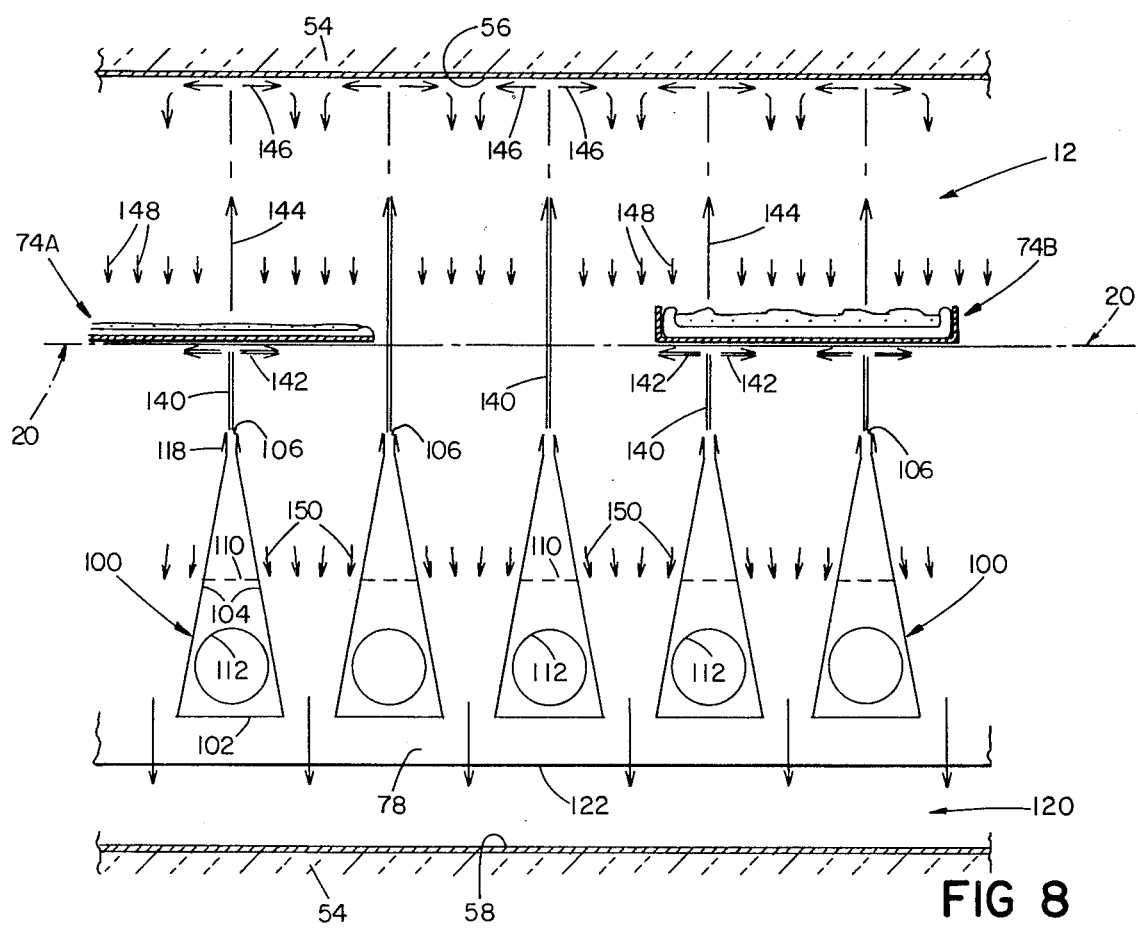

FIGS. 3 and 4 are sectional views taken along the lines 3—3 and 4—4 respectively of FIG. 2;

FIG. 5 is a perspective view of a nozzle unit employed in the oven shown in FIG. 1;

FIG. 6 is a sectional view taken along the line 6—6 of FIG. 2;

FIG. 7 is a sectional view taken along the line 7—7 of FIG. 2 showing a plan view of the conveyor system and treatment zone of the oven system; and FIG. 8 is a diagrammatic view illustrating air flows within the treatment zone of the oven system.

DESCRIPTION OF PARTICULAR EMBODIMENT

The oven unit shown in FIG. 1 is a main housing 10 5⅝ feet in overall length, about three feet in height, and about 4¼ feet in depth. Housing 10 defines a thermally insulated treatment zone 12 about five feet in length, about 2¾ feet in width, and about 2¼ feet in height. Caster wheels 14 support housing 10 and permits its ready positioning at a desired location. A pair of spaced arms 16 extend from each end of housing 10 and each pair of arms supports a roller 18 between which is trained a 32-inch wide food grade stainless steel wire transport belt 20 that has an open area of approximately 84 percent. Belt 20 extends through treatment chamber 12 via openings 22, 24 in opposite end walls of housing 10. A removable pan 26 is supported on each pair of arms 16 immediately below the upper run of conveyor belt 20. Access doors 28 are hingedly mounted on the front wall of housing 10 and have windows 30 which permit viewing of products within treatment zone 12. On top of main housing 10 is an auxiliary thermally insulated housing 40 that defines a conditioning plenum 42. Supported from one end wall of plenum 42 is a gas fired air heater 44 (FIG. 2) and supported on the opposite end wall of plenum 42 is a fan 46 (FIG. 2) that is driven by a 2 HP, 1750 rpm motor 48. Insulated hinged door 50 provides access to conditioning plenum 42 and oven controls are provided on adjacent control panel 52.

Further details of the oven system may be seen with reference to the sectional views of FIGS. 2, 3, and 4. Treatment zone 12 and conditioning plenum 42 are each surrounded by thermal insulation 54 (about three inches in thickness). The inner surfaces of treatment zone 12 are stainless steel and include planar upper wall surface 56 and parallel lower wall surface 58. Extending parallel to and adjacent the front and rear walls of treatment zone 12 are support members 60, 62, each of which has a flange 64 that supports the margin of the upper run of conveyor 20. Rollers 66 extend between support members 60, 62 and provide supplemental transverse support for the upper run of conveyor 20, while similar rollers 68 support the lower run of conveyor 20. Conveyor 20 is driven by motor 70 via drive belt 72 for transport of articles to be baked such as pizzas 74 through treatment zone 12.

At the rear of treatment zone 12 is a vertical partition member 78 that forms the forward wall of distribution plenum 80 that has in its upper wall (FIG. 6) an inlet port 82 from blower 46, curved deflection baffles 84, 86 and a series of ten cylindrical outlet port connections 88 at its lower portion. Vent tube 90 extends upwardly from plenum 80 and has a slide type control valve 92. A series of ten nozzle units 100 are mounted between outlet ports 88 and support rail 94 that extends along the front wall of treatment zone 12; the nozzle orifices being spaced about three inches below the upper run of conveyor 20, and surface 56 being spaced about nine inches above that upper run.

A nozzle unit 100 is shown in FIG. 5. Each nozzle unit is of 18 gauge stainless steel and has a length of about thirty inches and a height of about ten inches; and includes a horizontal bottom plate 102 about 4¼ inches in width, planar inclined side walls 104 that terminate in a nozzle orifice slot 106 that has a width of ¼ inch and extends the length of the nozzle unit, and generally triangular end walls 108. Distribution baffle plate 110 has an array of ⅛ inch diameter holes (open area of about 23 percent) and extends the length of nozzle unit 100 parallel to base plate portion 102. A three inch diameter cylindrical coupling sleeve 112 in one end wall of each nozzle unit provides connection to a corresponding plenum outlet 88, and a securing stud 114 projects downwardly from the bottom wall 102 at the opposite end for attachment to support rail 94. Spacers 116 are provided along the length of discharge slot 106 to maintain the ¼ inch nozzle slot opening, and flanges 118 on either side of nozzle opening 106 extend the length of the nozzle unit. In the oven, nozzle slots 106 are spaced about 5¾ inches apart along the length of treatment zone 12 and there is about 1½ inch spacing between adjacent baseplates 102.

Air is discharged from treatment zone 12 through exhaust port 120 below the bottom surfaces 102 of the nozzle units and between the bottom wall 122 of supply plenum 80 and the bottom wall 58 at the rear of treatment zone 12. Port 120 communicates with a return passage 124 that extends upwardly to port 126 (FIG. 6) in the bottom wall of conditioning plenum 42. Service door 128 on the rear wall of housing 10 provides access to return passage 124 and removable panel 130 provides access to distribution plenum 80.

As indicated in the sectional plan view of FIG. 7 and in the diagrammatic view of FIG. 8, products 74 to be baked are transported through zone 12 by conveyor 20, a typical conveyor speed being one foot per minute. A variety of size and types of pizzas may be concurrently baked including "thin" pizzas 74A (a crust of about ⅜") thickness) and "deep dish" pizza pies 74B (a depth of about 1½ inches) as well as a range of diameters, as indicated diagrammatically. Fully satisfactory and uniform baking is obtained over the full range of loadings from a single pizza to a fully loaded conveyor. Heated air at a temperature of about 550° F. is circulated from conditioning plenum 42 by blower 46 into distribution plenum 80 and directed by baffles 84, 86 to supply ports 88 for distribution to nozzle units 100. The heated air is distributed by baffles 110 and flows upwardly from nozzle orifices 106 in parallel streams (as indicated by arrows 140) at a velocity of about 4000 feet per minute. Portions of these upwardly flowing sheet streams of air impact against the bottom surfaces of pans of products 74 with effective sweeping heat transfer action as indicated by deflection arrows 142. Other portions of these high velocity sheet streams 140 bypass products 74 and flow upwardly as indicated by arrows 144 for impact against and deflection by upper surface 56 (as indicated by arrows 146). The deflected air flows downwardly at low velocity, as indicated by arrows 148 throughout the upper portion of treatment zone 12 and against the upper surfaces of products 74 to provide supplemental cooking action at the upper surfaces of those products. Thus the system provides efficient primary heat exchange action at the bottoms of products 74 by impact of relatively high velocity sheet stream flow of heated air, with supplemental low velocity air flow impingement and heat exchange on the top surfaces of products 74. Downward air flow continues through conveyor 20 with sweeping along sloping surfaces 104 of nozzles 100 as indicated by arrows 150 for exhaust from treatment zone 12 through exhaust port 120 and return to conditioning plenum 42 for conditioning via return passage 124.

This oven system provides efficient and uniform cooking of pizza products 74 over a wide range of conveyor loadings (partially and fully loaded), and cooks the pizzas efficiently (in about five minutes with a conveyor speed of about one foot per minute). Total oven circulation is between 1800 and 2300 cubic feet per minute. Air flow is controlled to minimize the escape of heat to the atmosphere. The system may be operated by relatively unskilled attendants, one attendant loading pizzas at the input end and removing and cutting pizzas from the output end during periods of moderate production, while at peak periods, one attendant may load pizzas at the input end and another attendant may remove and cut pizzas at the output end.

The design of the nozzle units 100 provides low maintenance with the sweeping air flows tending to dislodge particles which might fall through the conveyor. The nozzle units are readily accessible and individually removable when replacement is desired. The single array of nozzles below the conveyor provide spaced upwardly flowing streams of heated air for heat exchange impact against food products on the conveyor. Portions of those streams that bypass the food products flow against the reflection surface and a gentle downward counter-current flow is produced which impinges on the top surfaces of the food products being cooked and then is drawn downwardly through the conveyor for exhaust from the treatment zone. The process and apparatus provides a compact, balanced, versatile, and efficient cooking environment particularly useful for baking pizza products.

While a particular embodiment of the invention has been shown and described, various modifications will be apparent to those skilled in the art and therefore it is not intended that the invention be limited to the disclosed embodiment or to details thereof, and departures may be made therefrom within the spirit and scope of the invention.

What is claimed is:

1. An oven system for cooking food products and the like comprising a thermally insulated chamber defining a treatment zone, a conveyor for supporting products to be treated in said treatment zone, means for moving said conveyor to transport products through said treatment zone, said conveyor being substantially open to permit flow of air therethrough, an array of nozzles below said conveyor and disposed along the length and across the width of said treatment zone, a deflection surface above said conveyor forming an upper boundary of said treatment zone, exhaust port means below said conveyor, heating means, and means for flowing gas heated by said heating means to said nozzle array for discharge with substantial upward velocity for flow through said conveyor against bottom surfaces of food products on said conveyor with a portion of said upwardly flowing gas that bypasses said products flowing upwardly through said treatment zone for impact against said deflection surface and drawing the deflected gas downwardly in countercurrent flow for impingement on the top surfaces of products being transported through said treatment zone in supplemental low velocity heat exchange treatment and flow through said conveyor for exhaust from said treatment zone through said exhaust port means.

2. The oven system of claim 1 wherein said gas flow system includes a conditioning plenum, a distribution chamber coupled between said conditioning plenum and said nozzle array, a return passage coupled between said exhaust port means and said conditioning plenum, said heating means being coupled to said conditioning plenum for heating air within said conditioning plenum, and circulation means coupled to said conditioning plenum for flowing heated air from said conditioning plenum into said distribution chamber.

3. The oven system of claim 2 wherein said nozzle array includes a series of nozzle units, each said nozzle unit being of triangular configuration with a discharge slot orifice at the apex of the triangle that extends transversely of the direction of motion of said conveyor in said treatment zone, and having opposed end walls between which said discharge slot orifice extends, smooth slooping side walls that diverge at an included angle of less than 30 degrees, a supply port in one end wall, and a distribution baffle within the nozzle chamber in the flow path between said supply port and said discharge slot orifice.

4. The oven system of claim 1 wherein said nozzle array includes a series of nozzle units, each said nozzle unit having a discharge orifice in the form of an elongated slot that extends transversely of the direction of motion of said conveyor in said treatment zone.

5. The oven system of claim 4 wherein each said nozzle unit is of triangular configuration with a discharge slot orifice at the apex of the triangle.

6. The oven system of claim 5 wherein each said nozzle unit has opposed end walls between which said discharge slot orifice extends, a supply port in one end wall, and distribution baffle means within the nozzle chamber in the flow path between said supply port and said discharge slot orifice.

7. The oven system of claim 4 wherein each said nozzle unit has smooth slooping side walls that diverge at an included angle of less than 30 degrees.

8. The oven system of any preceding claim wherein said deflection surface is a smooth planar surface that is spaced above and extends parallel to said conveyor, said deflection surface being spaced a greater distance above said conveyor than the distance that the orifices of said nozzle array are spaced below the support surface of said conveyor.

* * * * *

REEXAMINATION CERTIFICATE (2963rd)

United States Patent [19]
Brown et al.

[11] B1 4,377,109
[45] Certificate Issued Aug. 6, 1996

[54] APPARATUS FOR BAKING FOOD PRODUCTS SUCH AS PIZZAS AND THE LIKE

[75] Inventors: Ernest C. Brown, Danvers; Walter E. Baske, Amesbury, both of Mass.

[73] Assignee: Wolverine Corporation, Merrimac, Mass.

Reexamination Request:
No. 90/003,720, Feb. 13, 1995

Reexamination Certificate for:
Patent No.: 4,377,109
Issued: Mar. 22, 1983
Appl. No.: 266,199
Filed: May 22, 1981

[51] Int. Cl.$^6$ ................................................ A47J 37/00
[52] U.S. Cl. .................. 99/401; 99/386; 99/443 C; 99/447; 126/21 A; 126/41 C
[58] Field of Search ................ 99/386, 451, 443 C, 99/447; 126/21 A, 41 C

[56] References Cited

U.S. PATENT DOCUMENTS

| Re. 24,144 | 4/1956 | Dungler | 34/656 |
| 3,398,466 | 8/1968 | Brown | 34/655 |
| 4,368,664 | 1/1983 | Smith et al. | 99/386 |

OTHER PUBLICATIONS

Middleby–Marshall model PS–250 brochure, 1980.
Middleby–Marshall brochure entitled "Middleby–Marshall Pacesetter—The Automated Baking Oven", Apr. 1981.
Middleby–Marshall JS–250 Owener's Maual entitled "Middleby–Marshall Owner's Manual Model PS–250 Pacesetter Oven", 1982.
Wolverine "Dryer and Ovens–Over 50 Years Experience", undated.

*Primary Examiner*—Timothy F. Simone

[57] ABSTRACT

A product conveyor that has a predominately open area transports food substances such as pizzas and the like to be cooked through a thermally insulated treatment zone. An array of nozzles disposed below the conveyor across the width and along the length of the treatment zone discharges streams of heated air upwardly through the conveyor against the bottom surfaces of the food products on the conveyor for primary heat exchange treatment. A reflection surface forms an upper boundary of the treatment zone, and the portion of the upwardly flowing air streams that is not deflected by the food products on the conveyor impinges against the deflection surface and is transformed into downward flowing relatively low velocity air for flow against and across the top surfaces of the food products. After those heat exchange interactions the air is drawn downwardly between the nozzles for exhaust at a point located below the conveyor.

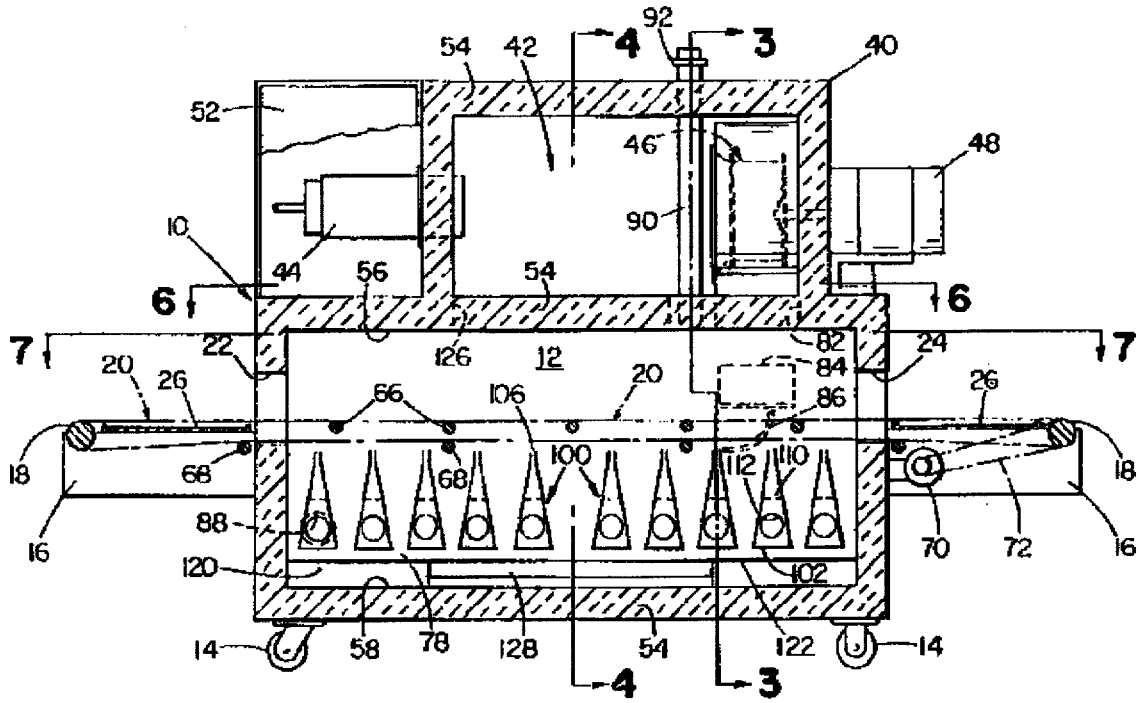

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 8 are determined to be patentable as amended.

Claims 2–7, dependent on an amended claim, are determined to be patentable.

1. An oven system for cooking food products and the like comprising
   a thermally insulated chamber defining a treatment zone,
   a conveyor for supporting products to be treated in said treatment zone,
   means for moving said conveyor to transport products through said treatment zone,
   said conveyor being substantially open to permit flow of air therethrough,
   an array of nozzles below said conveyor and disposed along the length and across the width of said treatment zone,
   a *planar* deflection surface *spaced above and extending* above said conveyor forming an upper boundary of said treatment zone,
   exhaust port means below said conveyor, and
   means for flowing heated gas to said nozzle array for discharge with substantial upward velocity for flow through said conveyor against bottom surfacs of food products on said conveyor with a portion of said upwardly flowing gas that bypasses said products flowing upwardly through said treatment zone for impact against said deflection surface and drawing the deflected gas downwardly in countercurrent flow for infringement on the top surfaces of products being transported through said treatment zone in supplemental low velocity heat exchange treatment and flow through said conveyor for exhaust from said treatment zone through said exhaust port means.

8. The oven system of any preceding claim, wherein said deflection surface is [a] smooth [planar surface that is spaced above] and extends parallel to said conveyor, said deflection surface being spaced a greater distance above said conveyor than the distance that the orifices of said nozzle array are spaced below the support surface of said conveyor.

* * * * *